United States Patent
Rook

[19]

[11] Patent Number: 6,006,480
[45] Date of Patent: Dec. 28, 1999

[54] LOW COST PREFABRICATED HOUSING CONSTRUCTION SYSTEM

[76] Inventor: John G. Rook, 33 Greenview Ct., San Francisco, Calif. 94131

[21] Appl. No.: 09/105,964

[22] Filed: Jun. 26, 1998

Related U.S. Application Data

[60] Provisional application No. 60/051,112, Jun. 27, 1997.

[51] Int. Cl.[6] ........................ E04C 1/00
[52] U.S. Cl. .......................... 52/309.12; 52/270; 52/281; 52/282.1; 52/282.3; 52/284; 52/309.8; 52/309.9; 52/309.4; 52/762; 52/764; 52/780; 52/781
[58] Field of Search .................. 52/309.12, 309.14, 52/309.17, 309.8, 309.9, 309.4, 762, 780, 781, 270, 281, 282.1, 282.3, 284

[56] References Cited

U.S. PATENT DOCUMENTS

| | | | |
|---|---|---|---|
| 3,984,957 | 10/1976 | Piazza | 52/309 |
| 4,133,859 | 1/1979 | Piazza | 264/71 |
| 4,232,494 | 11/1980 | Bauch et al. | 52/221 |
| 4,279,958 | 7/1981 | Ahmad | 428/215 |
| 4,578,915 | 4/1986 | Schneller | 52/309.12 |
| 4,612,744 | 9/1986 | Shamash | 52/220 |
| 4,774,794 | 10/1988 | Grieb | 52/309.7 |
| 5,473,849 | 12/1995 | Jones, Jr. et al. | 52/424 |

*Primary Examiner*—Christopher T. Kent
*Assistant Examiner*—Nikeisha J. Maddox
*Attorney, Agent, or Firm*—Fulwider Patton Lee & Utecht, LLP

[57] ABSTRACT

The housing system uses foam filled cement and fiberglass clad panels and cement fiberglass moldings to construct modular housing. The panels have a foam core made of polystyrene bead foam coated with an adhesion promoter and then covered with a laminate consisting of layers of continuous strand fiberglass matt and Portland cement. The moldings used to fit the sections together are also made from Portland cement and fiberglass. The panels can be shaped to serve multiple purposes, such as roof panels. Wall panels can be oriented so that the space left between the panel ends and the moldings can be filled with cement. An adhesion promoter can also be used to assist the bonding between the foam and fiberglass panels and the cement fiberglass moldings to provide greater structural strength for the resulting structure.

11 Claims, 5 Drawing Sheets

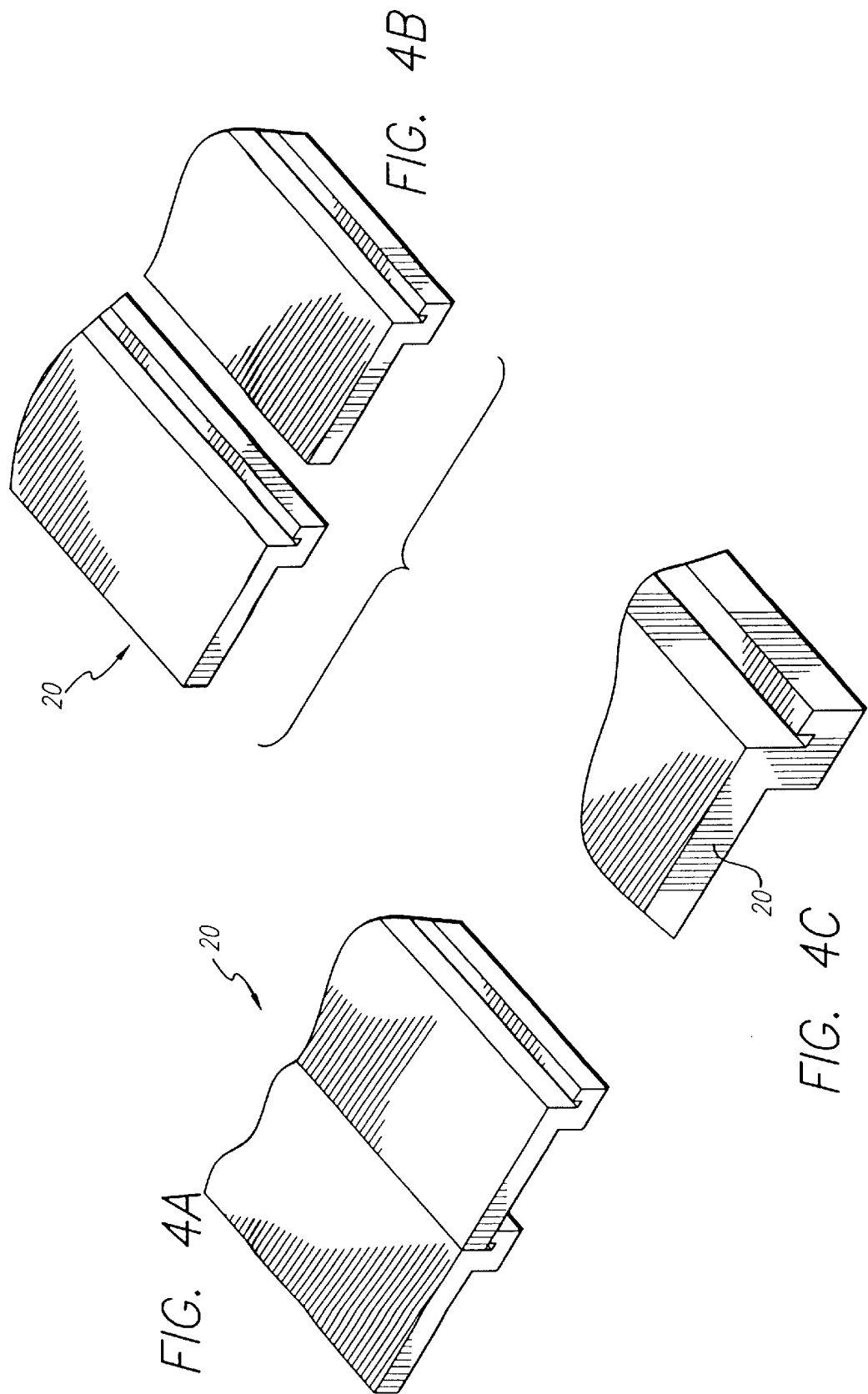

LOW COST PREFABRICATED HOUSING CONSTRUCTION SYSTEM

RELATED APPLICATIONS

This application is based upon provisional application Ser. No. 60/051,112, filed Jun. 27, 1997.

BACKGROUND OF THE INVENTION

1. Field of the Invention

This invention relates to prefabricated construction systems and more specifically to a system and method for construction of inexpensive private dwellings and small businesses where low costs and simplicity of construction are of primary importance.

2. Description of Related Technology

Construction of private dwellings in third world countries has been substantially limited by the relatively low availability of skilled labor and high strength building materials. Furthermore, the construction of dwellings in such countries has often been influenced by the frequently encountered high heat and humidity at such locations, combined with the resultant biological attacks on the structure from mildew, insects and organisms which thrive in a hot humid environment. One solution which has existed for ages in such locations is to make the housing out of relatively flimsy, locally available materials, such as palm fronds or straw and the like, combined with mud and clay infused into a bare structure. However, such structures, while certainly economical, provide little in the way of genuine protection from the elements and provide extensive cover for insects and vermin. Thus, it is very difficult to prevent the spread of disease in and among such dwellings, and the quality of daily life in such structures is necessarily low. Furthermore, such construction is not amenable to housing modern equipment or perishables, offers little shelter from the elements and thus severely limits their use for business purposes.

Also, the dwellings of this type often have a very high labor cost in terms of the number of man hours required to erect a dwelling and do not include simple provisions for any of the modem requirements for housing, including the availability of electrical wiring and the like. However, most applications for such housing are incompatible with relatively high cost of construction associated with modern dwellings, even if the low cost of labor in the local area is considered. Therefore, it would be useful to provide a construction design which would not use expensive materials, was easily fabricated in remote locations, and easily erected at the site where the housing is desired.

SUMMARY OF THE INVENTION

The present invention provides for a housing system that is cheap, impervious to rot, impervious to termites and other vermin, and is relatively fire resistant. At the same time, the system and method of the invention is capable of producing major panels for housing which are light enough to float on water if mounted on pontoons and panels and structures formed according to the invention are long lasting, maintain their appearance and are durable. Thus, the invention allows for relatively easy construction at a location remote from the manufacturing site for the panels. Products produced according to the invention provide excellent insulation and do not use wood as a key material, which is important in countries where wood is not easily available or is expensive to cut and process. The process and system of the invention provides for simple manufacture that can be used in developing countries to provide housing both from the standpoint of initial construction of the panels and erection of the panels into housing, and is applicable to places where raw materials are relatively scarce and there is very little in the way of organized industry.

Basically, the invention uses foam filled concrete and fiberglass clad panels and fiberglass moldings to construct modular housing. In a presently preferred embodiment, an important aspect of the invention is that the panels are made of polystyrene bead foam that has been coated with an adhesion promoter such as Weld Crete by Larson, then covered with a laminate consisting of layers of continuous strand fiberglass matt and Portland cement. In another presently preferred aspect of the invention, the moldings used to fit the sections together are also made from Portland cement and fiberglass. A presently preferred material for the fiberglass in such moldings is continuous strand matt, although other types of fiberglass material can also be used. In this way, the panels and moldings are made from easily prefabricated materials which are readily available and require little skilled labor to assemble.

In a presently preferred embodiment, another feature of the invention is that the panels are shaped to serve multiple purposes. More specifically, the roof panels are shaped so that a detail at one end of the panel acts as a reinforcement beam, a rain gutter and a support for the end of the panel that sits next to it. Wall panels can be oriented so that the space left between the panel ends and the moldings can be filled with concrete. Using this method of construction, the concrete acts both as a bonding agent to hold the panels and moldings together, and gives the structure tremendous compressive strength after it is set.

Another aspect of the invention is the use of an adhesion promoter to assist the bonding between the foam and fiberglass panels and the cement fiberglass moldings to provide greater structural strength for the resulting structure. In this application, an epoxy based adhesion promoter could be beneficial.

From the above, it may be seen that the present invention provides a system and method to construct inexpensive structures using prefabricated panels with high strength and repeatability in the manufacturing process.

These and other benefits of the invention will be evident from the following detailed description and drawings, which illustrate by way of example the features of the invention.

BRIEF DESCRIPTION OF THE DRAWINGS

FIG. 4 is an illustration of a perspective of how the roof panels would be constructed to provide for interlocking assembly; FIG. 4B is a perspective view of the panels separated to reveal the rain gutter end construction; and FIG. 4C is an enlarged perspective view of the rain end construction.

DETAILED DESCRIPTION OF THE PREFERRED EMBODIMENTS

Figure 1:
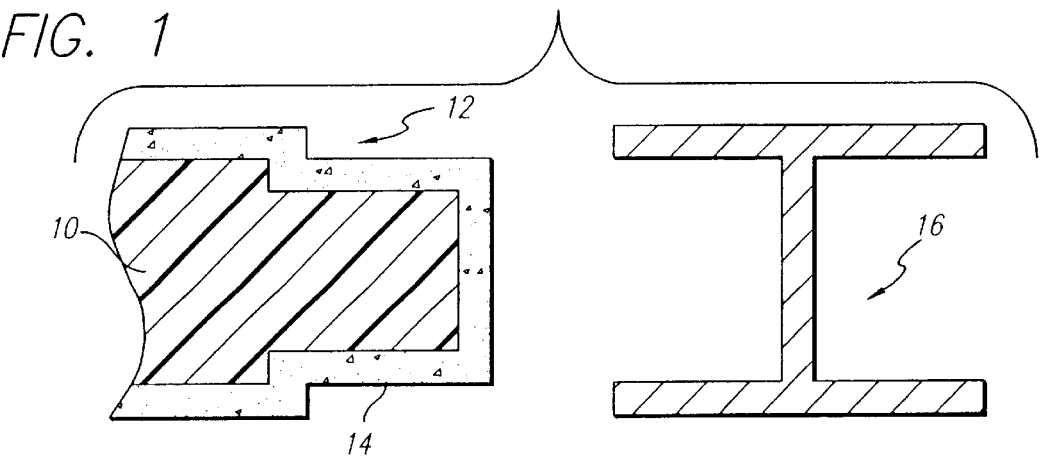
FIG. 1 is a drawing of the cross section of a panel and a molding section connecting the panel to any of a variety of parts on the structure.
Figure 2A:
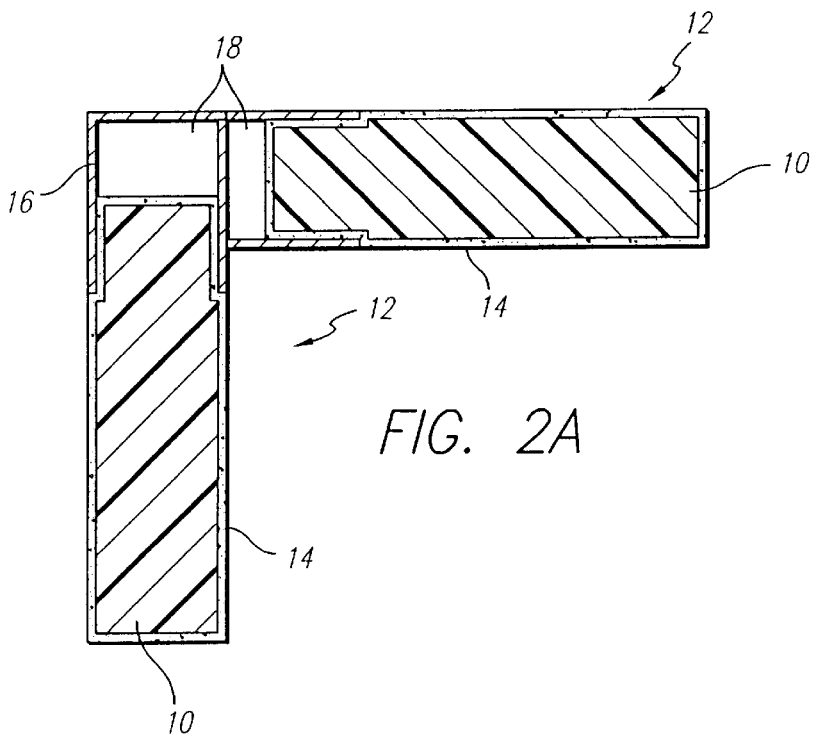
FIG. 2A is a cross-section of two panels at a corner and FIG. 2B is a cross-section of a connection of the panels at a wall to wall connection.
Figure 2B:
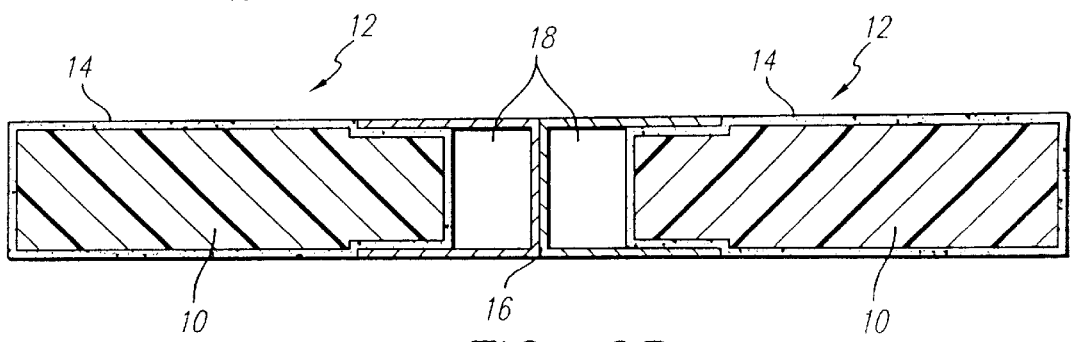

Turning now to the figures which are provided for the purposes of illustrating the invention, it may be seen from FIG. 1 that the construction method of the invention consists of using a polystyrene bead foam 10 construction within the panels 12 which had then been coated with a fiberglass and cement laminate 14 and these panels have been bonded together using molded sections 16 also made of cement and fiberglass. In order to promote strength and ease of construction, an adhesion promoter such as Weld Crete by Larson can be used between the concrete and other parts of the panel. As shown in FIG. 2, the molded sections include a cement fill area 18 between the panels and the moldings in order to provide a void into which cement may be poured to complete the structure and provide for increased compression strength of the assembled construction system.

Figure 3:
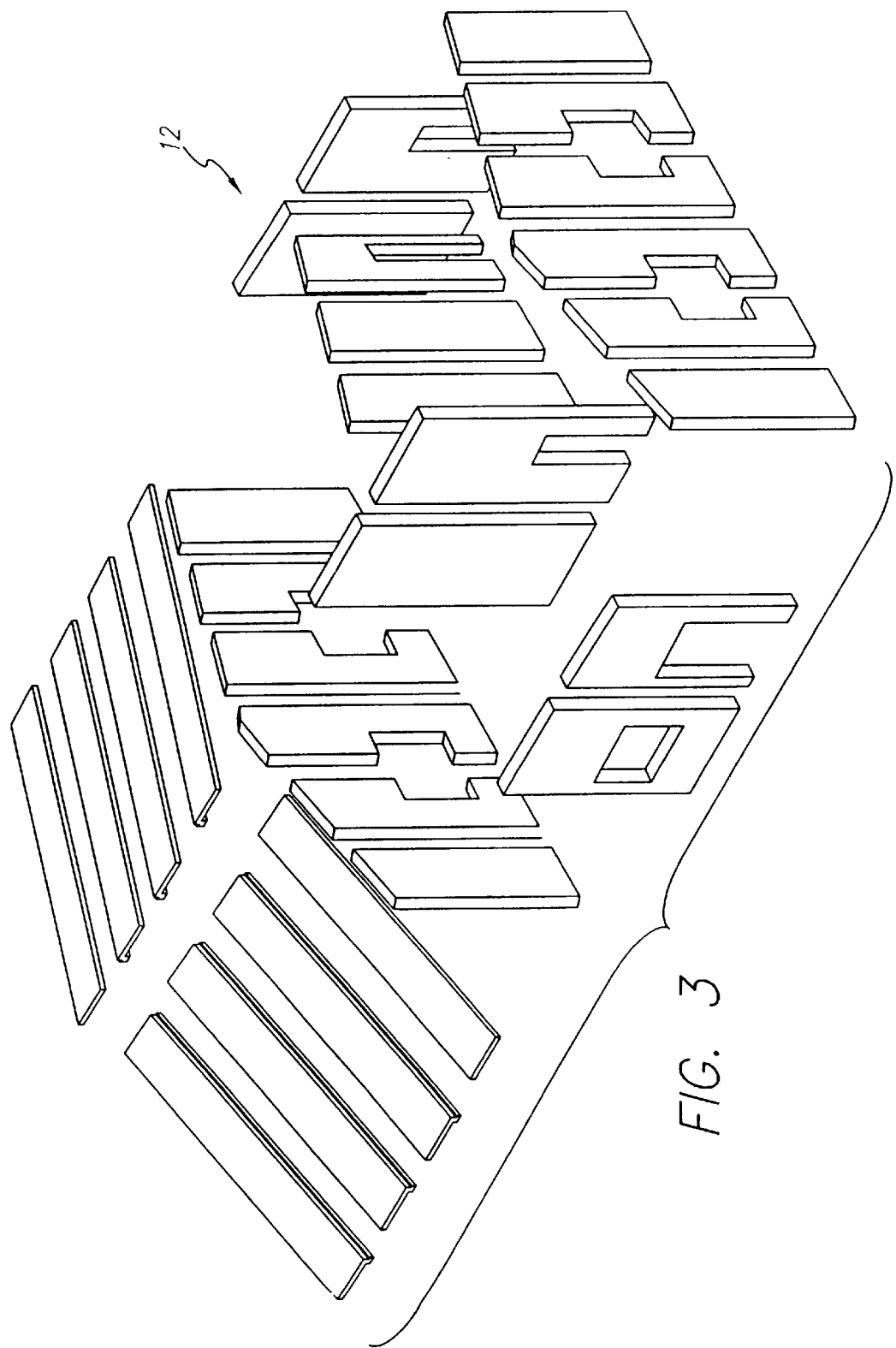
FIG. 3 is an exploded view of panel which will typically be used for construction of low cost housing using the invention.
Figure 5A:
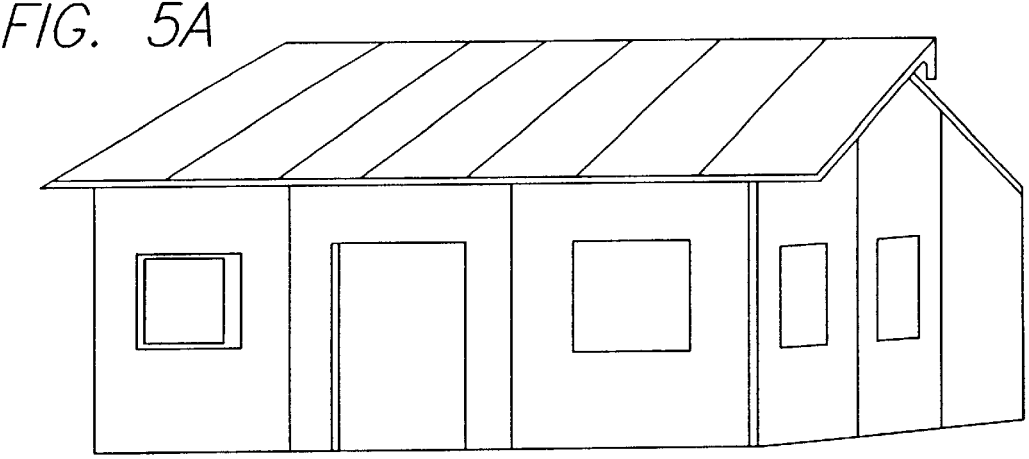
FIGS. 5A, 5B 5C, and 6A, 6B, and 6C show construction of a prototype property partially employing preliminary versions of panels incorporating the invention.
Figure 5B:
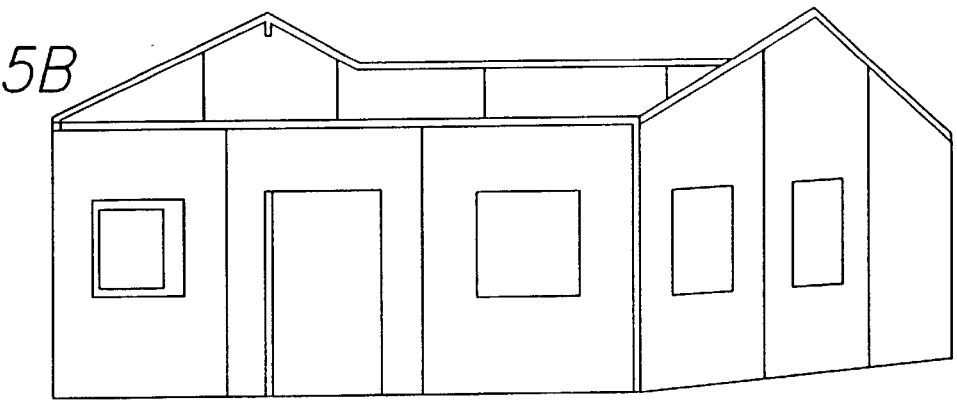
Figure 5C:
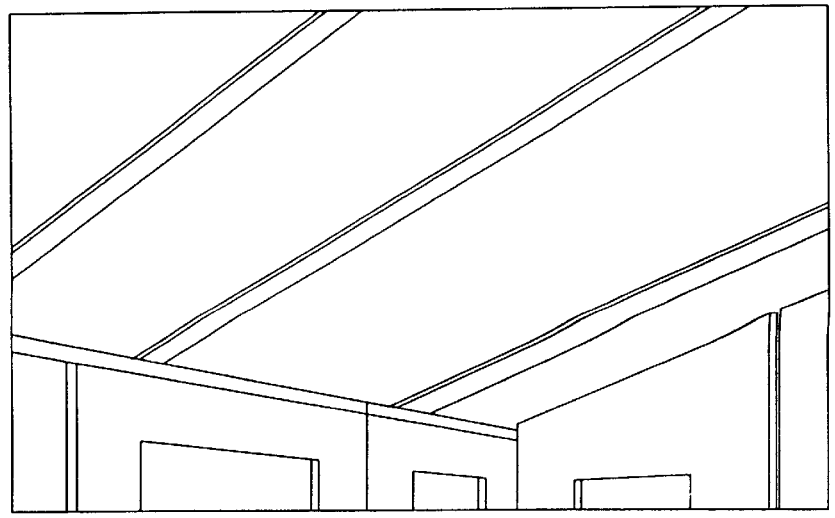
Figure 6A:
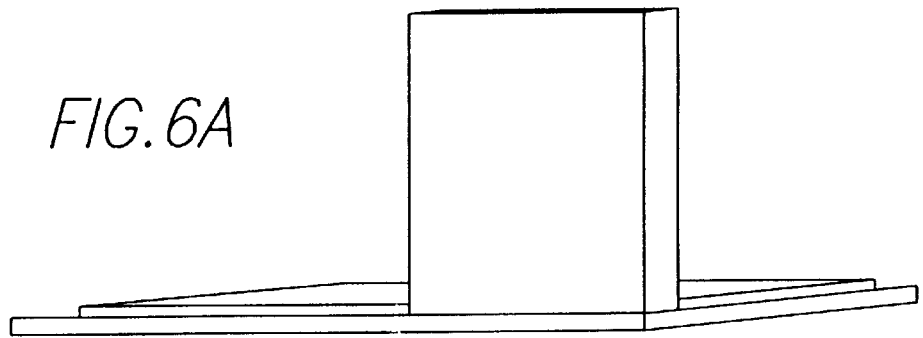
Figure 6B:
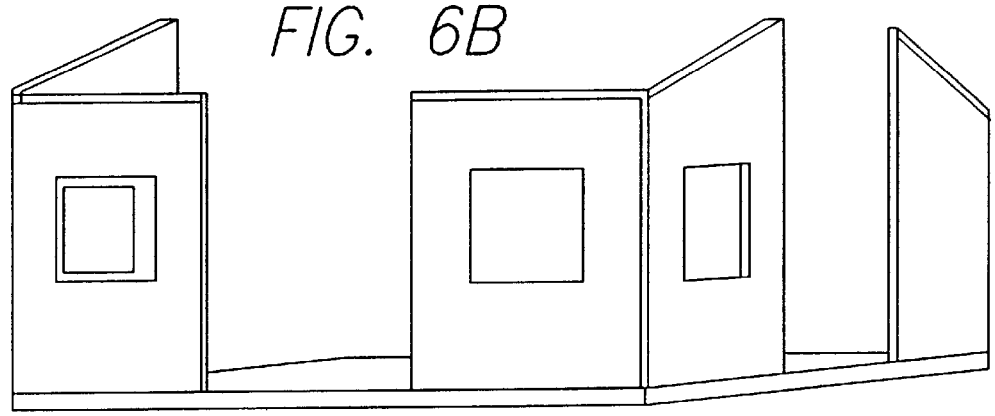
Figure 6C:
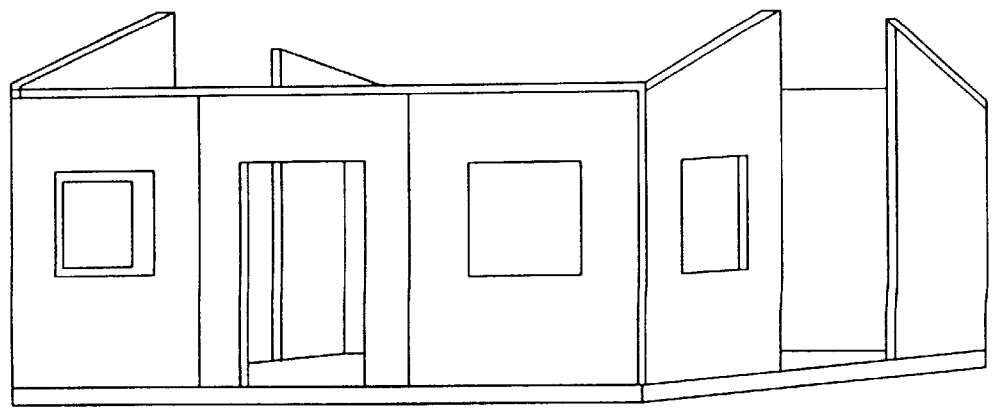

FIG. 3 illustrates a variety of panels which can be used in order to provide for a single dwelling using panels and the construction method of the invention. FIG. 4 illustrates the construction of one preferred aspect of the roof panels 20 in which the roof panels are molded so that they interlock one over the other at their intersection to provide water tightness and rigidity to the roof construction. FIGS. 5 and 6 show construction of a prototype dwelling which uses in part early versions of the construction method and apparatus of the invention.

From the above, it can be seen that the present invention provides important benefits in the construction of dwellings for locations in which commonly specified construction methods and skilled labor may be inappropriate. Accordingly, it is intended that the present invention not be limited except by the claims directed to the invention.

What is claimed is:

1. A system for constructing inexpensive housing structures comprising:

a plurality of prefabricated panels each having an outer structural shell having outer ends and an inner foam core; and a plurality of moldings each having first and second openings for receiving first and second ones of said outer ends of said plurality of prefabricated panels arranged end-to-end for connecting said plurality of prefabricated panels together to construct a modular housing, said prefabricated panels and said moldings interfitting so as to define a cement fill space therebetween, and bonding said panels and moldings together with cement in said cement fill space.

2. The system of claim 1, wherein said outer shell is formed of a composite of cement and fiberglass.

3. The system of claim 1, wherein said inner foam core comprises polystyrene bead foam.

4. The system of claim 1, wherein said panels are coated with an adhesion promoter to assist the bonding between the panels and the plurality of moldings to provide greater structural strength for the resulting structure.

5. The system of claim 4, wherein said adhesion promoter comprises an epoxy based adhesion promoter.

6. The system of claim 1, wherein said panels comprise roof panels molded so that they interlock one over the other at their intersection to provide water tightness and rigidity to the roof construction.

7. The system of claim 6, wherein said roof panels are shaped so that a detail at one end of the panel acts as a reinforcement beam, a rain gutter and a support for the end of a panel that sits next to it.

8. The system of claim 1, wherein said panels are shaped to serve multiple purposes.

9. The system of claim 1, wherein said molded sections comprise a composite of cement and fiberglass.

10. The system of claim 9, wherein said fiberglass in such moldings is continuous strand matt.

11. A method for constructing inexpensive housing structures using a plurality of prefabricated panels and a plurality of moldings interfitting with said plurality of prefabricated panels for connecting said plurality of prefabricated panels together, comprising the steps of:

providing a plurality of prefabricated panels each having an outer structural shell and an inner foam core;

providing a plurality of moldings interfitting with said plurality of prefabricated panels so as to provide a cement fill space therebetween for connecting said plurality of prefabricated panels together to construct a modular housing; and bonding said panels and moldings together with cement and an adhesion promoter in said cement fill space.

* * * * *

UNITED STATES PATENT AND TRADEMARK OFFICE
CERTIFICATE OF CORRECTION

PATENT NO. : 6,006,480
DATED : Dec. 28, 1999
INVENTOR(S) : John G. Rook

It is certified that error appears in the above-identified patent and that said Letters Patent is hereby corrected as shown below:

Column 2, line 59, change "4", to read --4A--.

Column 2, line 63, after "rain", add --gutter--.

Signed and Sealed this

Eighth Day of August, 2000

Attest:

Q. TODD DICKINSON

*Attesting Officer*   *Director of Patents and Trademarks*